(12) United States Patent
da Silva et al.

(10) Patent No.: US 6,661,738 B1
(45) Date of Patent: Dec. 9, 2003

(54) ORIENTATION AND CALIBRATION OF ACOUSTIC VECTOR SENSOR ARRAYS

(75) Inventors: Tacio Jose de Oliveira da Silva, Houston, TX (US); Bruce E. Cornish, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/174,766

(22) Filed: Jun. 19, 2002

(51) Int. Cl.[7] .................................................. G01V 1/40
(52) U.S. Cl. ...................... 367/25; 340/853.8
(58) Field of Search ............................. 367/25, 31, 907, 367/13; 340/853.8, 854.5; 33/303; 181/104

(56) References Cited

U.S. PATENT DOCUMENTS

| | | | |
|---|---|---|---|
| 4,381,610 A | * 5/1983 | Kramer | ........................ 33/312 |
| 5,089,989 A | * 2/1992 | Schmidt et al. | ................ 367/25 |
| 5,302,782 A | * 4/1994 | Owen | .......................... 181/104 |
| 6,430,150 B1 | * 8/2002 | Azuma et al. | ......... 340/825.01 |

* cited by examiner

Primary Examiner—Ian J. Lobo
(74) Attorney, Agent, or Firm—Conley Rose, P.C.; Mark E. Scott

(57) ABSTRACT

The specification describes a system and related method for determining the orientation of acoustic vector sensors installed in well bores that utilizes acoustic signals of known orientation in the casing to determine the orientation of the acoustic vector sensors. The acoustic vector sensors may be part of a string of acoustic sensors for acoustic or seismic surveys of subsurface formations, or may also be coupled to downhole devices for which orientations need to be know.

36 Claims, 3 Drawing Sheets

ORIENTATION AND CALIBRATION OF ACOUSTIC VECTOR SENSOR ARRAYS

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to determining the orientation of vector sensors in well bores. More particularly, the preferred embodiments are directed to determining orientation of a series of vector sensors after installation or after movement, as well as determining calibration of the vector sensors over time.

2. Background of the Invention

It is common in the oil and gas industry to install a series of acoustic sensing devices inside the well bore, yet outside the production tubing in a hydrocarbon producing well. These acoustic sensors are used to create three-dimensional and four-dimensional surveys of the hydrocarbon producing formation of interest. The acoustic sensors are typically physically attached to a cable, and are periodically spaced along the cable. More particularly, acoustic sensors are typically housed in groups of three, with each acoustic sensor in the housing or pod responsive to acoustic signals along orthogonal axis—hence the term "vector sensors." FIG. 1 shows an exemplary set of orthogonal axis, as well as an exemplary set of acoustic receivers 2A–C lying along those axis. If an acoustic signal is generated in the plane created by the XY axis, with no corresponding Z component, then only the acoustic sensors 2B and 2C receive a signal in response thereto. FIG. 2 exemplifies this situation. In particular, FIG. 2 shows that at an arrival time (indicated by the dashed line through all three acoustic response graphs), the signal received along the X axis (by receiver 2C) and the signal received along the Y axis (by receiver 2B) are the only axis in which acoustic signals are received. Moreover, FIG. 2 exemplifies that the source of the acoustic energy (not shown) was more closely orientated to the X axis than the Y axis as shown by the greater amplitude of the signal received along the X axis than that received along the Y axis. Thus, vector sensors have the ability to detect the orientation of an incoming signal. If the orientation of the vector sensors is known, then the orientation of the incoming signal may be calculated. Thus, knowing the orientation of each sensor pod is needed for correct operation of an acoustic or seismic system.

FIG. 3 shows a sensor cable 4 having a plurality of sensor pods 6A–E attached thereto disposed within a well bore 8. Because of the flexibility of the cable 4, the orientation of the pods 6A–E relative to each other is not known, and indeed may change during the installation process. The related art technique to determine the orientation of the sensor pods is to induce seismic or acoustic energy into the earth by a source 10 on the surface of the earth 12. In theory, the ray path of the acoustic energy created by the source 10 is confined to a plane containing both the source 10 and each respective receiver 6A–E, as indicated by the series of lines or rays 14 of FIG. 3. FIG. 4 shows an overhead view of the assumption shown in FIG. 3, indicating that the orientation of each ray 14 with respect to the borehole is assumed to be straight and known. The acoustic sensors in the sensor pods downhole receive the test signal originating from some distance from the borehole, with known orientation, and thus the orientation of the sensor pods may be calculated However, the assumption that the ray path between the source 10 and each receiver 6A–E lies in a plane is, in most instances, incorrect. FIG. 5 exemplifies that various subsurface anomalies, such as non-horizontal formations, affect the ray paths in at least the vertical plane shown, but also in the horizontal plane. FIG. 6 shows an overhead view of the situation of FIG. 5. In particular, FIG. 6 shows that the ray path from the source 10 may shift in the horizontal plane due to subsurface anomalies. FIG. 6 also shows some subsurface formations exhibit a property known as anisotropy. In anisotropic environments, acoustic waves are broken into two orthogonal components each having slightly different propagation speeds. In the exemplary system shown in FIG. 6, the propagating acoustic wave may be broken down into two orthogonal components, indicated by dashed lines 16A and 16B. Degradation of the test signal into orthogonal components exasperates the orientation determination process.

Thus, what is needed in the art is a method and related system to determine the orientation of sensor pods that is not affected by subsurface anomalies and characteristics.

BRIEF SUMMARY OF SOME OF THE PREFERRED EMBODIMENTS

The problems noted above are solved in large part by a method and related system of determining the orientation of sensor pods placed in well bores that is not affected by subsurface anomalies and characteristics. Preferably, a signal-generating mechanism produces an acoustic signal along the casing of the well bore. The acoustic signal is detected by sensor pods and is used to determine the orientation of the sensor pods relative to the acoustic signal. If the acoustic signal does not reach all sensor pods, additional acoustic signals are generated with some overlap of sensor pods, so that their relative orientations may be determined. In this way, the absolute orientation of only one sensor pod, or the absolute orientation of only one acoustic signal in the casing, needs to be known to ascertain the orientation of all the sensor pods in the array.

Most acoustic sensing devices, as well as seismic devices generally, have as their sensing mechanism a spring loaded inertial mass. The mass in the sensing mechanism moves responsive to received energy, and the movement correspondingly creates an electric signal. In the preferred embodiments, the acoustic sensor is used in reverse, and an electric signal is applied which in turn causes the inertial mass to oscillate. This, in turn, creates an acoustic signal. Thus, each acoustic sensor in each sensor pod may be the signal generating mechanism that produces the signal detected above or below the acoustic sensor operated in this manner.

In a second aspect of the preferred embodiments, the calibration or sensitivity of acoustic sensors in each sensor pod may be tested over time. That is, the sensor pods coupling to the casing, as well as the sensitivity of the sensor pods in general, and the acoustic sensing devices within each sensor pod, may change over time. If these changes are not accounted for in the acoustic and seismic measurements, they may lead to incorrect assumptions about the state of the hydrocarbon formation monitored. In the preferred embodiments, a baseline sensor pod response is created either simultaneously with the orientation determination, or as an independent test. At later times, the same tests may be run again to determine an amount of change in responsiveness of each sensor pod or particular sensing device. In this way, the data collected in subsequent acoustic surveys may be correspondingly corrected for any change in physical characteristics of the sensor pod or the individual sensing devices, such that these errors are riot attributed to changes in formation properties.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . .".

Also, the term "couple" or "couples" is intended to mean either an indirect or direct electrical or mechanical connection, depending on the context. Thus, if a first device couples to a second device, that connection may be through a direct connection, or through an indirect connection via other devices and connections.

While technically there may be some distinction between seismic signals and acoustic signals, the technical distinction being based generally upon the frequency or wavelength of such signals, for purposes of this specification, and in the claims, the term "seismic" and "acoustic" may be used interchangeably to denote energy propagating through earth formations.

DETAILED DESCRIPTION OF THE PREFERRED EMBODIMENTS

The preferred embodiments of the present invention are directed to determining the orientation of permanently or semi-permanently installed acoustic or seismic sensors in downhole hydrocarbon producing systems. As one of ordinary skill in the art will realize after reading the following discussion, the systems and related methods described are applicable to any downhole device for which an absolute orientation needs to be known, for example, the initial placement of a wipstock or muleshoe. Thus, while the preferred embodiments described below are in the context of determining the orientation of acoustic vector sensors, the discussion should not be read as a limitation as to the breadth of the claims.

Figure 1:
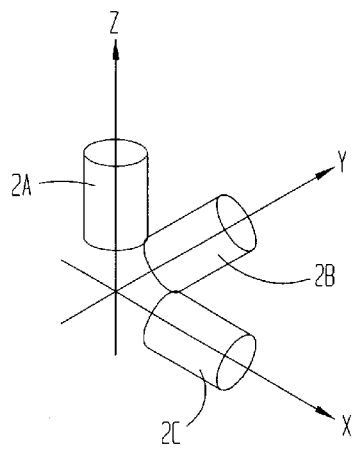
FIG. 1 shows a set of orthogonal axis and a corresponding set of orthogonally placed acoustic receivers.
Figure 2:
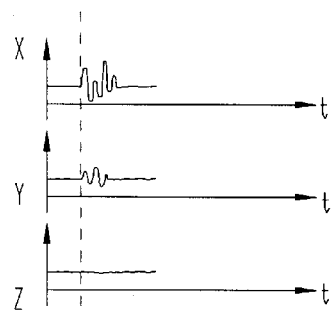
FIG. 2 shows an exemplary set of received signals by the acoustic receivers of FIG. 1.
Figure 3:
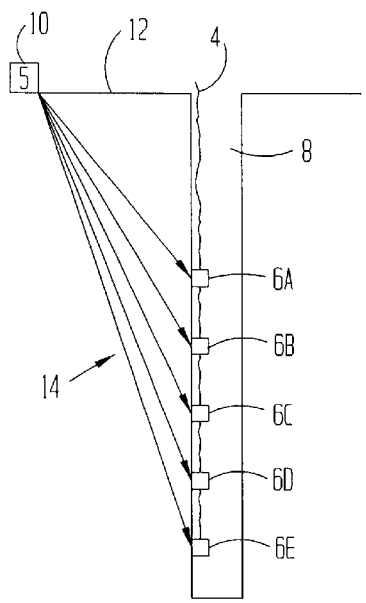
FIG. 3 shows the prior art technique for determining the orientation of downhole acoustic sensors.
Figure 4:
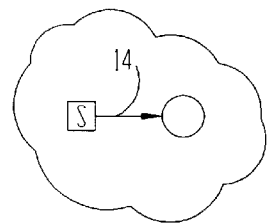
FIG. 4 shows an overhead view of the system of FIG. 3.
Figure 6:
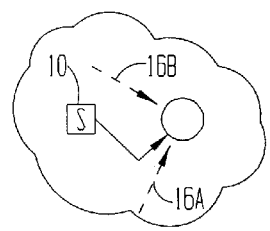
FIG. 6 shows an overhead view of the exemplary system of FIG. 5.
Figure 5:
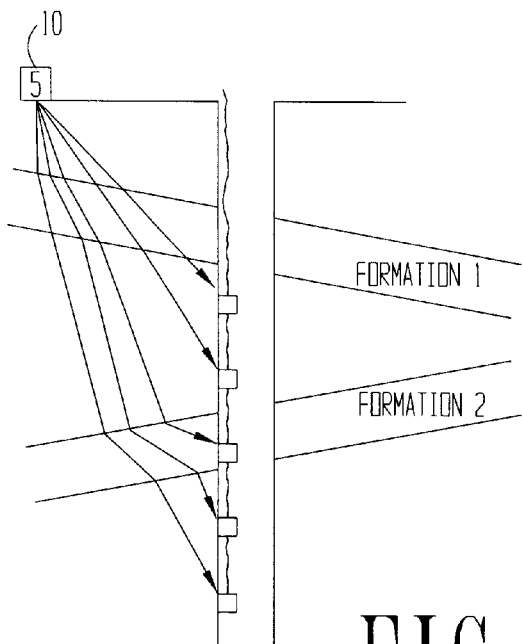
FIG. 5 shows how subsurface anomalies affect assumptions made in prior art determinations of orientation of sensor pods.
Figure 7:
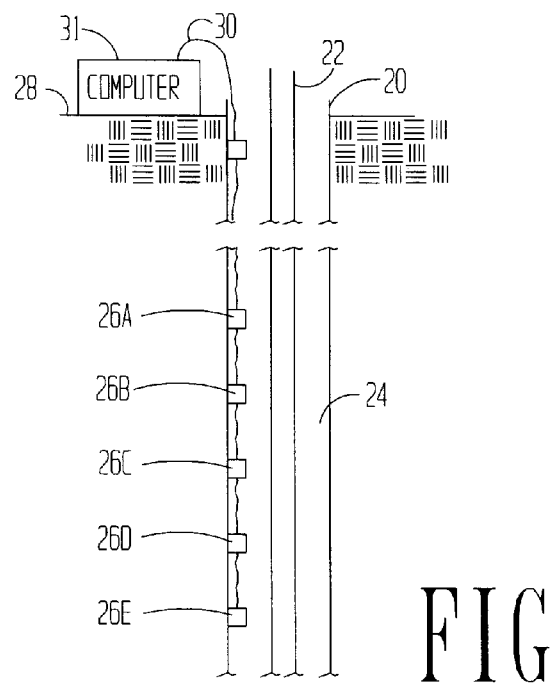
FIG. 7 shows a cross-sectional elevational view of an exemplary borehole containing a sensor string of the preferred embodiments.

FIG. 7 shows a cross-section of an exemplary borehole to provide context for a description of the preferred embodiments. In particular, a metallic casing 20 preferably extends into and provides a lining for a borehole. While the casing 20 is shown to be vertical, the system, and related methods described herein could likewise be practiced in a deviated borehole. FIG. 7 also shows the cross-section of a portion of production tubing 22 within the casing 20, thus producing a space 24. In such systems, it is within this space 24 that the vector sensors of the preferred embodiment are installed. Before proceeding, it must be understood, however, that the vector sensors of the preferred embodiment need not be installed in a producing well, and thus the presence of the space 24 between the casing 20 and production tubing 22 is not a requirement. Indeed, the vector sensors of the preferred embodiments could likewise be installed in any borehole, such as a dedicated survey well.

The vector sensors of the preferred embodiment, in FIG. 7 shown as sensors 26A–E, preferably couple to the surface 28 by way of an electrical cable 30. The cable 30 preferably couples to a surface computer 31 which receives electrical signals responsive to measured downhole energy, and which also in the preferred embodiments controls creation of energy for determining orientations of the various sensors (discussed more fully below). Preferably, the vector sensors 26A–E are in physical contact with the casing 20, or if a casing is not present, the wall of the borehole. In this way, acoustic energy propagating along the casing or borehole wall may be detected, in the vector sense, by each of the sensor pods 26A–E.

Figure 8:
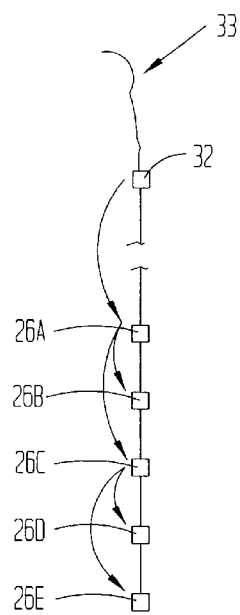
FIG. 8 shows an embodiment for determining the orientation of the sensor pods.

FIG. 8 shows one embodiment for determining orientation of the various sensor pods 26A–E. In particular, the embodiment of FIG. 8 shows a sensor pod 32 which is relatively close to the surface, and whose orientation is known. As will be discussed more fully below, preferably this sensor pod 32 acts as an acoustic source inducing a shear wave in the casing (not shown) in which the sensor string 33 is placed. The acoustic wave propagates along the casing and is detected by one or more of the sensor pods 26 below sensor pod 32. For purposes of illustration only, and not as a limitation, FIG. 8 shows that only sensor pod 26A (and any sensor pods between sensor pod 26A and 32) receive the acoustic signal generated by sensor pod 32. Thus, any sensor pod which receives the acoustic signal generated by sensor pod 32 may have its orientation determined because the orientation of the acoustic energy created by sensor pod 32 is known.

FIG. 8 further shows that, in the case where the acoustic energy created by sensor pod 32 cannot propagate the entire borehole (which is dependent upon the casing or tubing material upon which the shear wave is induced), sensor pods further down the line may act as acoustic sources (discussed below) to create acoustic energy to propagate down the casing. As shown in FIG. 8, sensor pod 26A, which received acoustic energy generated by sensor pod 32, acts as an acoustic source and propagates energy to sensor pods 26B and 26C. Although FIG. 8 shows only sensor pod 26A inducing enough acoustic energy to reach sensor pods 26B and 26C, it must be understood that many sensor pods may be within the range of any particular sensor pod acting in an acoustic transmitter mode. Likewise, FIG. 8 shows sensor pod 26C acting as an acoustic transmitter and transmitting acoustic energy to sensor pods 26D and 26E.

Because the orientation of sensor pod 32 is known in the embodiment of FIG. 8, each sensor pod which receives the acoustic signal or signals generated by sensor pod 32 may calculate an orientation. Once the orientation of a sensor pod is known, for example calculated based on receiving a signal of known orientation (even if the calculation is not immediately performed), that sensor pod creates acoustic energy which propagates to lower sensor pods, as shown in FIG. 8, until each sensor pod has a reference signal. In this way, the absolute orientation of each sensor pod in the string may be determined.

Figure 9:
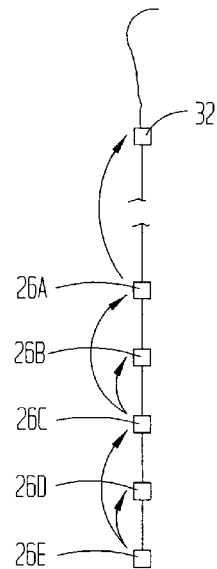
FIG. 9 shows another embodiment for determining the orientation of the sensor pods.

FIG. 9 shows yet another embodiment for determining the absolute orientation of the sensor pods in the string. In particular, in the system shown in FIG. 9, the lowest or deepest sensor pod 26E induces a shear wave in the casing which propagates to sensor pods 26D and 26C. Again, however, the system shown in FIG. 9 where sensor pod 26E can create acoustic energy only sufficient to reach 26D and 26C is only exemplary, and, depending on the propagation characteristics of the casing, it is possible that one sensor may have the ability to propagate an acoustic shear wave that may reach every sensor pod in the system. In the case, however, where each sensor pod acting as a transmitter only has a limited range, at least one of the sensor pods that was reached by the shear wave then acts as a transmitter and propagates the shear wave energy again. In FIG. 9, 26C likewise propagates energy to sensor pods 26B and 26A. Sensor pod 26A continues the process, eventually reaching the uppermost sensor pod 32 for which an absolute orientation is known. From this absolute orientation, the orientation of each of the sensor pods 26A–E may be determined.

Figure 10:
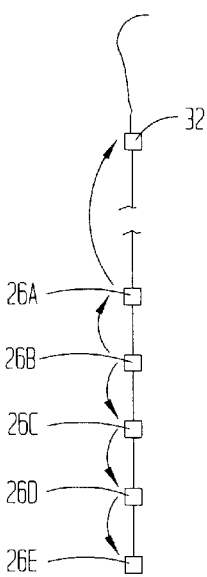
FIG. 10 shows another embodiment for determining the orientation of the sensor pods.

FIG. 8 shows propagating acoustic energy of known orientation from the top of the string, near the surface 28 to the bottom. FIG. 9 shows propagating acoustic energy of an unknown orientation from the bottom of the string, at sensor 26E, to the top of the string, sensor 32, and then determining the orientation of all the lower sensor pods based on the known orientation of the sensor 32. However, the process need not necessarily start near the surface or at the bottom of the string. FIG. 10 shows an embodiment where a medial sensor pod initially creates the acoustic energy. In particular, FIG. 10 shows that sensor pod 26B creates acoustic energy which propagates in both directions, reaching both sensor pods 26A and 26C. With the same caveat regarding the number of sensor pods that may be reached by any acoustic energy transmission, FIG. 10 shows that the downward going acoustic signal is received by sensor pod 26C and repeated for 26D, and likewise sensor pod 26D receives acoustic energy and repeats that downward for sensor pod 26E. In the upward direction, sensor pod 26A receives the acoustic energy created by sensor pod 26B and repeats that toward the surface until eventually the acoustic energy is received at sensor pod 32, which in the embodiment of FIG. 10 has a known orientation. Thus, the relative orientation of the sensor pods may be determined based on the upward and downward signals (that is, their orientations relative to each other), and their absolute orientations may be determined from the known orientation of sensor pod 32. One of ordinary skill in the art, having now been exposed to the embodiments described, could easily calculate the orientations of the various sensor pods in relation to the known orientation of sensor pod 32 for the various embodiments described. Before proceeding, it must be understood that in the embodiments shown in FIGS. 8–10, the sensor pod 32 is of known orientation because it is close to the surface and may be observed, or even have its orientation adjusted; however, the sensor pod with a known orientation need not necessarily be at the surface, and other techniques may exist for establishing the absolute orientation of one of the sensor pods at any location within the borehole, which may then be used as a reference to determine the orientations of the remaining sensor pods in the string.

The sensor pods of the preferred embodiment are acoustic vector sensor arrays, called pods because each pod contains three orthogonally situated acoustic sensors. The acoustic sensors of the preferred embodiments operate on the principle of having an inertial mass which vibrates in response to acoustic energy polarized along its axis. Vibration of the inertial mass in response to the acoustic energy thus creates an electrical signal representative of the frequency and amplitude. However, these acoustic sensors may likewise be used as acoustic sources. That is, rather than simply sensing electrical signals created by movement of inertial mass, electrical signals of particular frequencies, preferably a signal sweeping a band of frequencies, may be applied to the acoustic sensor, which in turn vibrates the inertial mass. Vibrating of the inertial mass induces acoustic energy into the casing for use in determining the relative orientation of the sensor pods as discussed above. Preferably, when a sensor pod is used as an acoustic transmitter, each acoustic sensor within the pod generates acoustic energy sequentially. Thus, the acoustic sensors receiving the acoustic energy for orientation purposes receive acoustic energy sequentially in three polarization or orientation directions, thus increasing the accuracy of the orientation determination. One of ordinary skill in the art, however, could devise an equivalent system utilizing only one or two acoustic sensor in a sensor pod to create the reference acoustic energy. Acoustic devices capable of performing this dual function of both receiving and acting as a source may be purchased from Geospace L.P., 7334 Gessner, Houston, Tex. 77040; Input/Output Inc., 11104 West Airport Boulevard, Houston, Tex. 77477. While acoustic sensors from these manufacturers are preferred, the sensors from any manufacturer may be used, and likewise any sensing device within inertial mass, such as a geophone or an accelerometer, may equivalently be used.

Figure 11:
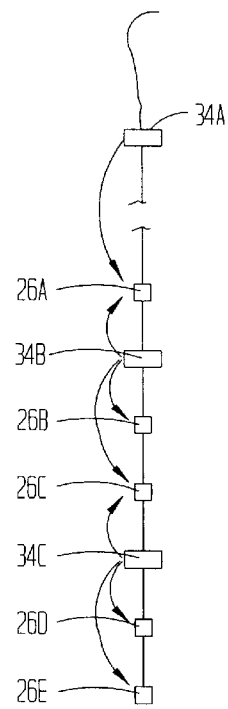
FIG. 11 shows yet another embodiment for determining the orientation of the sensor pods using dedicated acoustic transmitters.

If, however, a particular installation of acoustic sensors requires the use of sensing devices that do not have an inertial mass, the principles of the embodiments above may still be utilized. In particular, FIG. 11 shows an alternative embodiment in which dedicated acoustic sources 34A–C are periodically spaced among the sensor pods 26A–E. In the exemplary embodiment shown in FIG. 11, the dedicated source 34A induces acoustic energy into the casing (not shown in FIG. 11) at a known orientation, and the acoustic energy propagates to one or more of the acoustic transmitters 26. FIG. 11 shows that the second dedicated acoustic source 34B creates acoustic energy which propagates both up to sensor pod 26A, as well as down to sensor pods 26B and 26C. A corresponding arrangement is shown with respect to dedicated acoustic transmitter 34C and sensor pods 26D–E. Thus, all the sensor pods between the dedicated sources 34A and 34B may have their orientations determined by detecting the acoustic energy transmitted in the known orientations by acoustic transmitter 34A. Upon the transmitter 34B transmitting acoustic energy to sensor pod 26A, the orientation between sensor pod 26A and transmitter 34B may be determined, and thus all the orientations of sensor pods 26B and 26C may be determined. The same result follows with respect to the orientation of the transmitter 34C and the sensor pods 26D and 26E. While FIG. 11 shows that there is no overlap in the acoustic range of the dedicated acoustic transmitters 34A–C, one of ordinary skill in the art, now understanding how to use the dedicated acoustic transmitters along with the sensor pods, could easily devise equivalent systems in which transmitting of acoustic energy from one dedicated acoustic transmitter may overlap other acoustic transmitters such that there would be no need for sensor pods above any particular transmitter to receive the acoustic energy from below to determine their orientations. As mentioned with respect to FIGS. 8–10, determining the orientation of the various transmitters and therefor sensor pods need not work from near the surface 28 toward the bottom, but may likewise may start at the bottom and work toward the surface, or may start from a medial portion, working both directions in sequence or simultaneously.

While the various embodiments described above indicate the need for having at least one sensor or transmitter for which an orientation is known, in yet another embodiment, this need not necessarily be the case. Indeed, so long as the relative orientation of each of the sensor pods is determined, even if that determination is not made with regard to an absolute surface or geologic reference prior to obtaining acoustic or seismic readings, the data from the seismic measurement may still be correlated to some other known location, such as a subsurface anomaly whose absolute orientation has been previously established.

In addition to being capable of determining the orientation of various sensor pods in permanently or semi-permanently installed seismic systems, the preferred embodiments of the present invention may also be used to determine the sensitivity or characteristics of the sensor string over time. In particular, and as discussed with respect to FIG. 7, the sensor string 33 of the preferred embodiments is permanently or semi-permanently placed in a casing 20. Thus, the string 33 may be used in a first instance to perform a three-dimensional seismic or acoustic survey. At a later time, the same string 33 may be used again to perform a second instance of a three-dimensional seismic or acoustic survey, which when combined with the first instance creates a four-dimensional survey. However, over time, responsiveness of particular sensors in a sensor pod, or the coupling of the sensor pod to the casing, may change, which thus affects the amplitudes of the signals received by the sensor pods. If this degradation of the coupling of the sensor pods, or degradation of the sensors themselves, is not compensated for, then seismic data obtained will inaccurately show changes in the subsurface structures. In the preferred embodiments, prior to running an acoustic or seismic survey using the string 33 and sensor pods 26A–E, the orientation test is run again. At this time, however, the test is not necessarily to determine the orientation of the various sensor pods 26A–E (although if there has been a change, this should be noted), but instead the test is to determine the differences in received signals from previous orientation tests, such that the differences in coupling and acoustic signal receiving sensitivity may be accounted for in the seismic or acoustic survey.

In yet another embodiment, the techniques described above may be used to determine orientation of other downhole devices. That is, the orientation of many downhole devices needs to be known for proper drilling and operation of the hydrocarbon producing well. For example, it is common in the industry to drill a single relatively vertical well bore, and then drill a plurality of lateral wells off the vertical well bore to reach the hydrocarbon producing zones. Generally speaking, a wipstock, is used to direct a drill string equipment into a particular lateral. Thus, the absolute orientation of this wipstock needs to be known. The methods described above with regard to determining the orientation of the various sensor pods may likewise be utilized in determining the orientation of such downhole devices. In the exemplary case of the wipstock, a sensor pod may be coupled to the wipstock, either permanently or possibly only for initial installation. Once the wipstock has been placed, its orientation may be tested using the techniques described above. More particularly, the sensor pod on the wipstock could create seismic energy which propagates to a sensor pod having a known orientation; conversely, a sensor pod or acoustic source having a known orientation could create acoustic energy which is detected by the sensor pod on the wipstock. Thus, in much the same way as described above, the absolute orientation of the wipstock could be determined. It is noted that any number of sensor pods or acoustic transmitters could be used to sequentially propagate and receive the acoustic energy along the casing to determine the orientation of the wipstock. It is noted again that the wipstock is presented only for purposes of example. The orientation of any number of downhole devices may be critical to operation or creation of a hydrocarbon producing well, and any such device could use the methods described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. In a system having a plurality of acoustic vector sensor pods located in a cased borehole, a method of determining an orientation of the acoustic vector sensor pods comprising:
   inducing in the casing an acoustic signal of known orientations;
   detecting the acoustic signal by the plurality of acoustic vector sensor pods; and
   determining the orientation of each of the acoustic vector sensor pods in relation to the acoustic signal of known orientation.

2. The method as defined in claim 1 wherein inducing in the casing an acoustic signal of known orientation further comprises operating an acoustic transmitter of known orientation.

3. The method as defined in claim 2 wherein operating an acoustic transmitter of known orientation further comprises operating an acoustic receiver in a first acoustic vector sensor pod as the acoustic transmitter to create the acoustic signal, the acoustic vector sensor pod having known orientation.

4. The method as defined in claim 3 further comprising operating remaining acoustic receivers in the first acoustic vector sensor pod sequentially as acoustic transmitters, each operation inducing in the casing an acoustic signal of known orientation.

5. The method as defined in claim 4 wherein detecting the acoustic signal by the plurality of acoustic vector sensor pods further comprises detecting each of the acoustic signals generated by the first acoustic vector sensor pod.

6. The method as defined in claim 2 wherein operating an acoustic transmitter of known orientation further comprises operating a dedicated acoustic transmitter, to induce in the casing the acoustic signal of known orientation.

7. A structure comprising:
 a well bore having a casing;
 a plurality of vector sensing devices coupled to an electrical cable forming a sensor string, the sensor string within the casing and each vector sensing device contacting the casing;
 a transmitting device having a known orientation within the casing, the transmitting device imparts acoustic energy into the casing;
 a surface computer coupled to each of the plurality of sensing devices and the transmitting device; and
 wherein the surface computer is adapted to activate the transmitting device, read signals created by the vector sensing devices responsive to acoustic energy in the casing, and calculate an orientation of the vector sensing devices relative to the transmitting device.

8. The system as defined in claim 7 wherein transmitting device is a vector sensing device of known orientation operated as an acoustic transmitter.

9. The system as defined in claim 8 wherein the vector sensing device of known orientation further comprises an acoustic vector sensor having three individual acoustic receivers aligned along orthogonal axis.

10. The system as defined in claim 9 wherein the surface computer is further adapted to operate sequentially each individual acoustic receiver in the acoustic vector sensor of known orientation.

11. In a system having a plurality of vector sensors disposed within a well bore having a casing, a method of determining the orientation of the plurality of vector sensors comprising:
 creating a shear wave in the casing;
 establishing orientations of the vector sensors relative to the shear wave; and
 calculating an orientation of the plurality of vector sensors based on one of: knowing an orientation of one of the plurality of vector sensors; and knowing an orientation of the shear wave.

12. The method as defined in claim 11 wherein creating a shear wave in the casing further comprises activating an acoustic source coupled to the casing.

13. The method as defined in claim 12 wherein activating an acoustic source coupled to the casing further comprises activating a dedicated acoustic transmitter.

14. The method as defined in claim 12 wherein activating an acoustic source coupled to the casing further comprises utilizing an acoustic receiver as an acoustic source.

15. The method as defined in claim 11 wherein establishing orientations of the vector sensors relative to the shear wave further comprises:
 detecting, at each of the plurality of vector sensors, the shear wave in the casing; and
 calculating the orientation of each of the plurality of vector sensors in relation to an orientation of the shear wave in the casing.

16. A method comprising:
 installing a plurality of acoustic sensing devices in a well bore having a casing;
 establishing a baseline responsiveness of the acoustic sensing devices to acoustic signals in the casing; and thereafter
 testing the plurality of acoustic sensing devices to determine a deviation of their responsiveness from the baseline responsiveness.

17. The method as defined in claim 16 wherein establishing a baseline responsiveness of the acoustic sensing devices to acoustic signals in the casing further comprises:
 inducing an acoustic signal in the casing; and
 detecting the acoustic signal with the plurality of acoustic sensing devices, at least an amplitude of a detected acoustic signal for each acoustic sensing device indicative of the baseline responsiveness of the acoustic sensing devices.

18. The method as defined in claim 17 wherein testing the plurality of acoustic sensing devices to determine the deviation of their responsiveness from the baseline responsiveness further comprises:
 inducing an acoustic signal in the casing;
 detecting the acoustic signal with the plurality of acoustic sensing devices, at least an amplitude of a detected acoustic signal for each acoustic sensing device indicative of the responsiveness of the acoustic sensing devices; and
 determining the deviation between the detected acoustic signals and the baseline responsiveness.

19. The method as defined in claim 16 wherein establishing a baseline responsiveness of the acoustic sensing devices to acoustic signals in the casing further comprises establishing the baseline responsiveness of the acoustic sensing devices to acoustic signals in the casing during determining an orientation of the acoustic sensing devices.

20. The method as defined in claim 19 establishing the baseline responsiveness of the acoustic sensing devices to acoustic signals in the casing during determining an orientation of the acoustic sensing devices further comprises:
 creating a shear wave in the casing;
 establishing relative orientations of the acoustic sensing devices and the shear wave; and
 calculating an orientation of the plurality of acoustic sensing devices based on one of: knowing an orientation of one of the plurality of sensing devices; and knowing an orientation of the shear wave.

21. The method as defined in claim 20 wherein creating a shear wave in the casing further comprises activating an acoustic source coupled to the casing.

22. The method as defined in claim 21 wherein activating an acoustic source coupled to the casing further comprises activating a dedicated acoustic transmitter.

23. The method as defined in claim 21 wherein activating an acoustic source coupled to the casing further comprises utilizing an acoustic receiver in each of the acoustic sensing devices as an acoustic source.

24. A method of making four-dimensional seismic surveys, the method comprising:
 installing a plurality of seismic vector sensors in a cased borehole;
 determining an orientation of the plurality of seismic vector sensors;
 determining a first sensitivity of the plurality of seismic vector sensors;

performing a first three-dimensional seismic survey; and thereafter determining a second sensitivity of the plurality of seismic vector sensors;

performing a second three-dimensional seismic survey;

correcting data of the second three-dimensional seismic survey based on the difference between the first and second sensitivity; and combining the first and second three-dimensional seismic survey to create the four-dimensional seismic survey.

25. The method as defined in claim 24 wherein determining an orientation of the plurality of vector sensors and determining a first sensitivity of the plurality of seismic vector sensors further comprises:

inducing a signal of known orientation in the casing;

detecting the signal by the plurality of seismic vector sensors;

determining the orientation of each of the seismic vector sensors in relation to the signal of known orientation; and recording the first sensitivity based on a set of received signals detected during the detecting the signal step.

26. The method as defined in claim 24 wherein determining a second sensitivity of the plurality of seismic vector sensors further comprises:

inducing a signal of approximately the same amplitude and orientation as used for determining the first sensitivity;

detecting the signal by the plurality of seismic vector sensors; and recording the second sensitivity based on a set of received signals detected during the detecting the signal step.

27. The method as defined in claim 24 wherein correcting data of the second three-dimensional seismic survey step based on the difference between the first and second sensitivity further comprises correcting data of the second three-dimensional seismic survey step based on a sensitivity change between first and second sensitivity.

28. The method as defined in claim 24 wherein installing a plurality of seismic vector sensors in a cased borehole further comprises placing a plurality of seismic vector sensors periodically spaced along and coupled to an electrical cable within the cased borehole.

29. The method as defined in claim 28 wherein determining an orientation of the plurality of vector sensors and determining a first sensitivity of the plurality of seismic vector sensors further comprises:

inducing a signal of known orientation in the casing;

detecting the signal by the plurality of seismic vector sensors;

determining the orientation of each of the seismic vector sensors in relation to the signal of known orientation; and recording the first sensitivity based on a set of received signals detected during the detecting the signal step.

30. The method as defined in claim 29 wherein determining a second sensitivity of the plurality of seismic vector sensors further comprises:

inducing a signal of approximately the same amplitude and orientation as used in determining the first sensitivity;

detecting the signal by the plurality of seismic vector sensors; and recording the second sensitivity based on a set of received signals detected during the detecting the signal step.

31. The method as defined in claim 30 wherein correcting data of the second three-dimensional seismic survey step based on the difference between the first and second sensitivity further comprises correcting data of the second three-dimensional seismic survey step based on a sensitivity change between first and second sensitivity.

32. A method a determining an orientation of an acoustic vector sensor pod installed in a cased borehole, the method comprising:

creating an acoustic signal in the casing having a known orientation;

detecting the acoustic signal with the acoustic vector sensor pod; and calculating the orientation of the acoustic vector sensor pod based on the acoustic signal having a known orientation.

33. The method as defined in claim 32 further comprising;

connecting the acoustic vector sensor pod to a downhole device to be positioned; and calculating the orientation of the downhole device.

34. The method as defined in claim 33 wherein connecting the acoustic vector sensor pod to a downhole device to be positioned further comprises connecting the acoustic vector sensor pod to a valve to be positioned downhole.

35. The method as defined in claim 33 wherein connecting the acoustic vector sensor pod to a downhole device to be positioned further comprises connecting the acoustic vector sensor pod to a wipstock for positioning downhole.

36. The method as defined in claim 33 wherein connecting the acoustic vector sensor pod to a downhole device to be positioned further comprises connecting the acoustic vector sensor pod to a muleshoe used to position downhole tools.

* * * * *

UNITED STATES PATENT AND TRADEMARK OFFICE
CERTIFICATE OF CORRECTION

PATENT NO. : 6,661,738 B1
DATED : December 9, 2003
INVENTOR(S) : Tacio Jose de Oliveira da Silva and Bruce E. Cornish It is certified that error appears in the above-identified patent and that said Letters Patent is hereby corrected as shown below:

<u>Column 8,</u>
Line 50, the term "orientations" should read -- orientation --.

Signed and Sealed this

Twentieth Day of January, 2004

JON W. DUDAS
*Acting Director of the United States Patent and Trademark Office*